Figure 1:
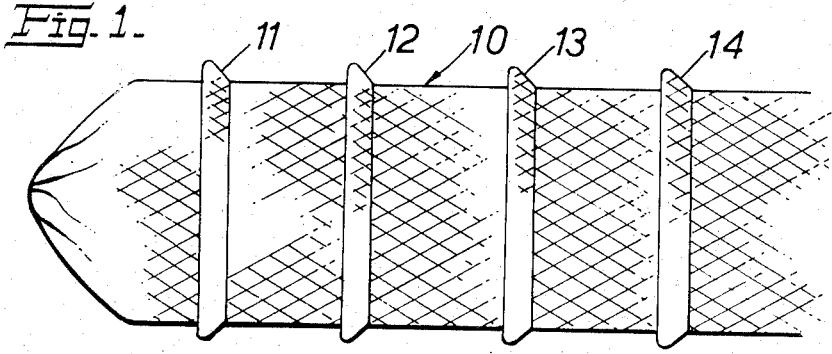

United States Patent [19]

Rivenaes et al.

[11] 3,822,497
[45] July 9, 1974

[54] TRAWL ARRANGEMENTS

[75] Inventors: Ivar Rivenaes, Krakenes; Oddvar Johan Lid, Fyllingsdalen, both of Norway

[73] Assignee: Ivar Rivenaes A/S, Damsgardson, Norway

[22] Filed: Aug. 6, 1973

[21] Appl. No.: 386,123

[30] Foreign Application Priority Data
Aug. 21, 1972 Norway............................... 2991/72
Jan. 10, 1973 Norway.................................. 96/73

[52] U.S. Cl. ................................................... 43/9
[51] Int. Cl. ............................................ A01k 73/02
[58] Field of Search ......................................... 43/9

[56] References Cited
UNITED STATES PATENTS
3,018,581  1/1962  Luketa..................................... 43/9
3,132,436  5/1964  Luketa..................................... 43/9

*Primary Examiner*—Antonio F. Guida
*Assistant Examiner*—Daniel J. Leach
*Attorney, Agent, or Firm*—Allison C. Collard

[57] ABSTRACT

Trawl arrangement having an adjustable trawl bag volume comprising a trawl bag with connecting means each connected to one or more mesh members thereof. The connecting means have a tensile strength less than the tensile strength of said mesh members and are adapted to extend axially of the trawl bag while contracting together said trawl bag in an axial direction to form one or more axially double-layered annular folds. A break-producing portion of each connecting means has said tensile strength preselected according to the object of use, each end of said portion having a fastening portion designed for reception of mesh formations arranged directly opposite each other in the trawl bag folding. The connecting means are adapted to be fastened into the trawl bag independently of each other for absorbing their respective proportion of the axially directed tensile force therethrough.

13 Claims, 6 Drawing Figures

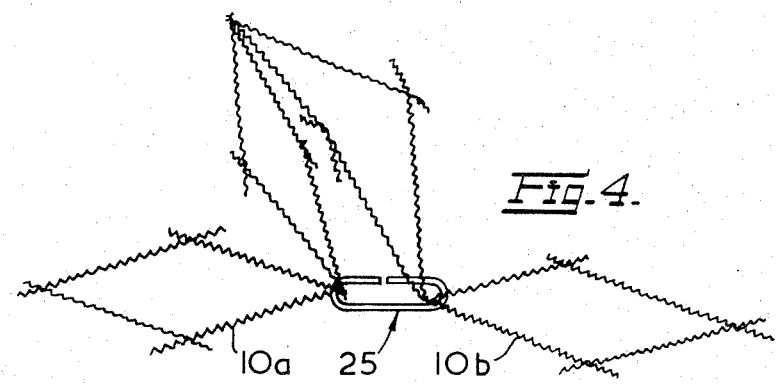
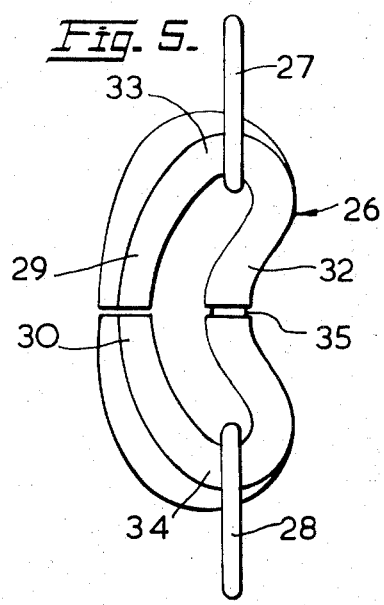
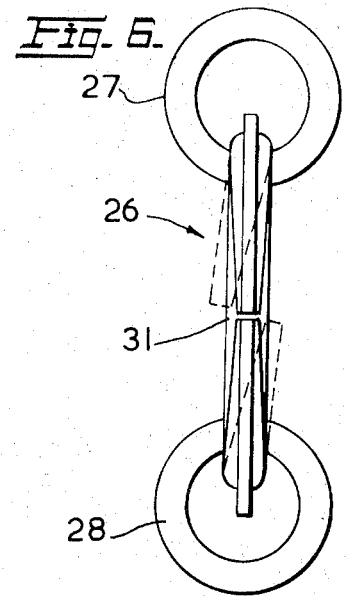

TRAWL ARRANGEMENTS

This invention relates to trawl arrangements having an adjustable trawl bag volume.

In trawl fishing it often happens that the trawl bag after it is full of fish during transfer on board bursts due to the stretching of the fish while being lifted to sea level. Such a bursting of the travel bag involves first of all loss of the catch and secondly destruction of the trawl, so that the latter at best is put out of use for an extended period of time. In order to avoid such bursting of the trawl bag it is necessary to have an adjustable volume for the trawl bag. Hitherto, there have been produced various relatively complicated proposals having an electromechanical control of the load on the trawl bag and various proposals for remotely controlling the volume of the trawl bag.

It is an object of the present invention to provide a trawl arrangement by means of which the automatic control of the volume of a trawl bag can be simplified.

According to the present invention a trawl arrangement having an adjustable trawl bag volume comprises a trawl bag, connecting means each connected to one or more mesh members of said trawl bag and having a tensile strength less than the tensile strength of said mesh members, said connecting means contracting together said trawl bag in an axial direction to form one or more axially double-layered annular folds and being adapted to extend axially of said trawl bag, a break-producing portion of said connecting means having said tensile strength preselected according to the object of use, and a fastening portion at each end thereof designed for reception of mesh formations arranged directly opposite each other in the trawl bag folding, said connecting means being adapted to be fastened into the trawl bag independently of each other for absorbing their respective proportion of the axially directed tensile force therethrough.

The connecting means can be in the form of an approximately C-shaped hoop member the back portion of which is provided just opposite the legs of the C-shape with said break-producing portion, said legs of the C-shape being adapted to be forced outwardly from each other in a direction transversely of the main plane of the C-shape in order to permit threading on of the travel bag meshes. Preferably, the legs of the C-shape are thrust tightly together flush with each other.

On breaking the connecting means the two portions of the C-shape which are parted at the break location are pulled away from each other and can be readily removed from the trawl bag and can be readily replaced with a new connecting means for forcing the legs of the C-shape of the new connecting means outwardly from each other.

It is preferred that the back portion of the C-shape has an approximately circular cross-section, while the legs of the C-shape and the transition portion between the back portion and the legs have substantially larger cross-sectional dimensions measured in the main plane of the C-shape than in a direction at right angles to said plane.

In order to obtain a desired break in the break-producing portion at a definite load the break-producing portion is provided with a smaller cross-sectional area than the remaining back portion of the C-shape.

In order to ensure that the break occurs solely at the break loading the break-producing portion is arranged flush with the points of engagement of the connecting means with the meshes of the trawl bag or associated fastening means, the connecting means considered in plan having an approximately kidney-shaped contour with the break-producing portion disposed at the concave arc of the kidney shape.

In another form of the invention, the connecting means comprises two separate fastening elements which are adapted to be permanently connected to the trawl bag at preselected locations in the latter and which are connected to each other by means of a replacement element containing the break-producing portion.

The fastening elements can be key rings with the replaceable element having a loop portion at each end engaging a respective key ring, said loop portions being joined by an intermediate bar portion constituting said break-producing portion.

Alternatively, the replaceable element can be the approximately C-shaped hoop member of the preceding embodiment, the outwar forcing from each other of the legs in a direction transversely of the main plane of the C-shape permitting threading on of the fastening elements.

Figure 2:
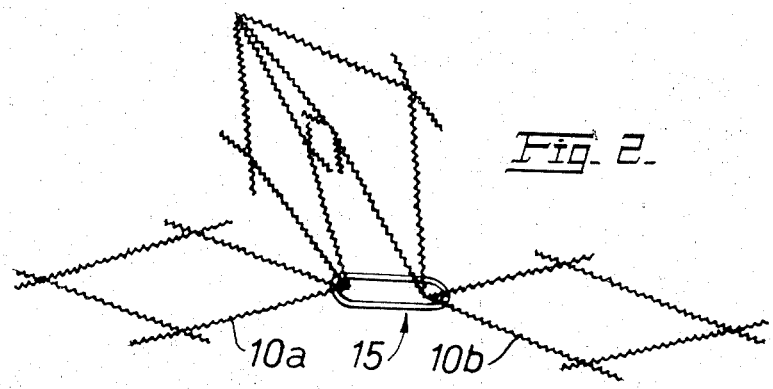
Figure 3:
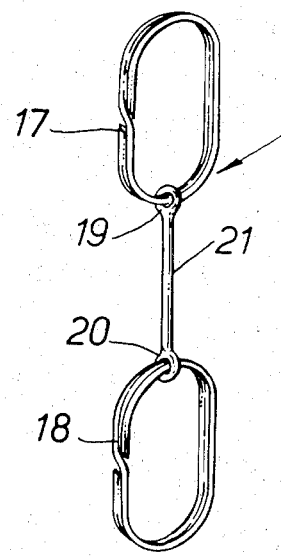

In order that the invention can be more clearly understood, convenient embodiments thereof will now be described, by way of example, with reference to the accompanying drawings in which:

FIG. 1 is an elevation of a portion of a trawl bag arrangement according to the present invention, FIG. 2 is a schematic representation of a connecting means fastening in between two meshes of a trawl bag, FIG. 3 is a perspective view of a connecting means composed of two fastening rings and an intermediate bar portion of preselected tensile strength, FIG. 4 is a schematic representation similar to that of FIG. 3 showing an alternative connecting means fastened in between two meshes of a trawl bag, FIG. 5 is a side elevation of a connecting means which includes two fastening rings for permanent installation in a trawl bag at desired locations, and FIG. 6 is a side edge elevation of the connecting means of FIG. 5.

In FIG. 1 there is shown one of several possible ways of effecting the contracting together of a trawl bag 10. There is illustrated an axial contraction in which there are formed four annular contractions 11–14 due to one or more annular series of meshes forming local folds outside the trawl bag. The series of meshes which lie outside the trawl bag, are supposed to be unloaded during normal use, the load in the trawl bag being transferred via an annular series of connecting means 15, in a manner such as is illustrated in FIG. 2, by corresponding connections between opposite meshes 10a and 10b in two annular mesh series along the periphery of the trawl bag. Each mesh 10a in the one mesh series can be separately connected to its corresponding mesh 10b in the other mesh series as is shown in FIG. 2 or if desired two or more adjacent meshes in a series of meshes can be connected to a corresponding number of adjacent meshes in the other series of meshes by means of an associated connecting means, so that there is achieved simultaneously both axial and radial contracting of the trawl bag. It is also possible with exclusively radial contracting of meshes, so that there are formed axially extending mesh folds.

It is an assumption that the connecting means are to be broken in pieces if the load in the trawl bag exceeds a predetermined load and further decided that the connecting means are to be broken in pieces before there is a danger of breaks in the mesh members of the trawl bag. The exact tensile strength of the connecting means is calculated all according to the dimensions of the trawl bag and the dimensions of the mesh members and all according to which function and connecting means are to have in the individual trawl bag.

In FIG. 2 there is indicated an annular connecting means 15, and such a connecting means can for example be constructed similarly to a key ring, there being stipulated a particular tensile strength for a local bar-like portion of the ring.

In FIG. 3 there is shown a preferred construction for a connecting means 16, consisting of three separate parts, namely, a first annular fastening means 17 and a second annular fastening means 18 and an intermediate means 19–21. The annular fastening means 17 and 18 are illustrated in the form of key rings with a tensile strength at least greater than the tensile strength of the means 19–21, and the rings 17, 18 are adapted to be threaded permanently in engagement with their respective mesh or meshes, so that when a break occurs in the means 19–21 it can be readily replaced by a new means 19–21 on repairing the trawl bag before use. The means 19–21 includes two loop-forming portion 19, 20 and an intermediate bar portion 21. It is preferred that the bar portion 21 be given a definite, desired tensile strength for each means 19–21, for example, by weakening this portion in an arbitrary manner.

Instead of the illustrated connecting means 14 or 16 it can also be of interest to utilize thread material or the like which is bound at opposite ends directly into the meshes or with the meshes via annular or alternatively designed fastening means.

In FIG. 4 there is indicated a first connecting means 25 having a general C-shaped form. The connecting means 25 can be of an arbitraritly suitable material and is fastened directly into the meshes of the trawl bag.

In FIG. 5 there is illustrated a modified construction of connecting means, designated by the reference numeral 26. The connecting means 26 is not fastened directly into the meshes of the trawl bag but on the contrary is fastened into two fastening rings 27, 28 which are permanently secured at desired locations in the trawl bag, that is to say, fastened into its or their mesh formations. The fastening rings can for example be fastened into the trawl bag in the manufacture of the latter or can be tied into the trawl bag in a suitable manner.

The connecting means 26 consists of an approximately C-shaped hoop member which in the position of use forms a substantially closed ring, the legs 29, 30 of the hoop in the position of use thrusting tightly together flush with each other, but as required can be forced from each other in a direction at right angles to the main plane of the hoop so that there is formed an entrance gap 31 between the legs, for example, for threading on fastening rings 27, 28 or similar fastening means.

In order to ensure the rigidity of the connecting means 26 in the position of use and to permit the legs 29, 30 to be forced from each other as required in a direction at right angles to the main plane of the hoop, the hoop is designed with a circular cross-section at the back portion 32 of the C-shape, while the legs 29, 30 and the transition portion 33, 34 between the legs and the back portion are designed with a substantially greater cross-sectional dimension in the main plane of the hoop than in a direction at right angles to the main plane of the hoop.

In the back portion 32 there is formed a break-producing portion 35 in the form of an annular groove, so that the break in the connecting means can be produced just at the groove or the portion 35. In the preferred embodiment the connecting means 26 is made of plastic, for example, of nylon or another plastic material which can provide a precisely established tensile strength for a given cross-sectional area.

In order to ensure that the intended break in the connecting means 26 occurs by a pull action and preferably not by a bending action the connecting means 26 is designed so that back portions 32 are arranged flush with the tensile forces which are exerted in the hoop at its opposite ends, that is to say, flush with the central axes of the transition portions 33, 34. In practice this involves the connecting means viewed in plan having an approximately kidney-shaped contour, with the break-producing portion 35 arranged in the concave curve of the kidney shape.

It will be readily appreciated that when utilising a C-shaped hoop member either with or without the two separate fastening elements, the connecting means is especially easy to mount and replace with a new one after a break has occurred during use of the trawl arrangement.

What we claim is:

1. Trawl arrangement having an adjustable trawl bag volume which comprises a trawl bag, connecting means each connected to one or more mesh members of said trawl bag and having a tensile strength less than the tensile strength of said mesh members, said connecting means contracting together said trawl bag in an axial direction to form one or more axially doublelayered annular folds and being adapted to extend axially of said trawl bag, a break-producing portion of said connecting means having said tensile strength preselected according to the object of use, and a fastening portion at each end thereof designed for reception of mesh formations arranged directly opposite each other in the trawl bag folding, said connecting means being adapted to be fastened into the trawl bag independently of each other for absorbing their respective proportion of the axially directed tensile force therethrough.

2. The arrangement in accordance with claim 1, wherein the connecting means comprises two separate fastening elements which are adapted to be permanently connected to the trawl bag at preselected locations in the latter and which are connected to each other by means of a replaceable element containing the break-producing portion.

3. The arrangement according to claim 2, wherein said fastening elements are key rings and said replaceable element has a loop portion at each end engaging a respective key ring, said loop portions being joined by an intermediate bar portion constituting said break-producing portion.

4. The arrangement in accordance with claim 1, wherein the connecting means comprises an approximately C-shaped hoop member the back portion of which is provided just opposite the legs of the C-shape with said break-producing portion, said legs of the C-shape being adapted to be forced outwardly from each other in a direction transversely of the main plane of the C-shape in order to permit threading on of the trawl bag meshes.

5. The arrangement in accordance with claim 4, wherein the legs of the C-shape are thrust tightly together flush with each other.

6. The arrangement in accordance with claim 4, wherein said back portion of the C-shape has an approximately circular cross-section, said legs of the C-shape and transition portions between said bag portion and said legs having substantially larger cross-sectional dimensions reckoned in the main plane of the C-shape than in a direction at right angles to said plane.

7. The arrangement in accordance with claim 4, wherein said break-producing portion is provided with a smaller cross-sectional area than the remainder of said back portion.

8. The arrangement in accordance with claim 4, wherein the break-producing portion is arranged flush with the points of engagement of said hoop member with the meshes of the trawl bag, said hoop member having in plan an approximately kidney-shaped contour with said break-producing portion disposed at the concave arc of said kidney shape.

9. The arrangement in accordance with claim 2, wherein said replaceable element is an approximately C-shaped hoop member the back portion of which is provided just opposite the legs of the C-shape with said break-producing portion, said legs of the C-shape being adapted to be forced outwardly from each other in a direction transversely of the main plane of the C-shape in order to permit threading on of said fastening elements.

10. The arrangement in accordance with claim 9, wherein the legs of the C-shape are thrust tightly together flush with each other.

11. The arrangement in accordance with claim 9, wherein said back portion of the C-shape has an approximately circular cross-section, said legs of the C-shape and transition portions between said back portion and said legs having substantially larger cross-sectional dimensions reckoned in the main plane of the C-shape than in a direction at right angles to said plane.

12. The arrangement in accordance wit claim 9, wherein said break-producing portion is provided with a smaller cross-sectional area than the remainder of said back portion.

13. The arrangement in accordance with claim 9, wherein the break-producing portion is arranged flush with the points of engagement of said hoop member with said fastening elements, said hoop member having in plan an approximately kidney-shaped contour with said break-producing portion disposed at the concave arc of said kidney shape.

* * * * *